United States Patent
Kadel et al.

(10) Patent No.: US 9,585,031 B2
(45) Date of Patent: Feb. 28, 2017

(54) METHOD TO GUIDE THE PLACEMENT OF NEW SMALL CELL

(71) Applicant: DEUTSCHE TELEKOM AG, Bonn (DE)

(72) Inventors: Gerhard Kadel, Darmstadt (DE); Paul Arnold, Frankfurt (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 14/648,928

(22) PCT Filed: Nov. 21, 2013

(86) PCT No.: PCT/EP2013/074355
§ 371 (c)(1),
(2) Date: Jun. 2, 2015

(87) PCT Pub. No.: WO2014/086586
PCT Pub. Date: Jun. 12, 2014

(65) Prior Publication Data
US 2015/0327082 A1    Nov. 12, 2015

(30) Foreign Application Priority Data
Dec. 7, 2012 (EP) ..................... 12196130

(51) Int. Cl.
*H04W 24/02* (2009.01)
*H04W 64/00* (2009.01)
(Continued)

(52) U.S. Cl.
CPC ........... *H04W 24/02* (2013.01); *H04W 16/20* (2013.01); *H04W 64/003* (2013.01); *H04W 84/045* (2013.01)

(58) Field of Classification Search
CPC ... H04W 16/20; H04W 24/02; H04W 64/003; H04W 84/045
(Continued)

(56) References Cited

U.S. PATENT DOCUMENTS

| 8,520,634 B2 * | 8/2013 | Wu | ........................ | H04W 24/02 |
| | | | | 370/328 |
| 2006/0071399 A1 * | 4/2006 | Asada | .................. | B65H 3/0684 |
| | | | | 271/117 |

(Continued)

FOREIGN PATENT DOCUMENTS

| EP | 2506623 A2 | 10/2012 |
| WO | WO 02071781 A1 | 9/2002 |
| WO | WO 2010034495 A1 | 4/2010 |

*Primary Examiner* — Nathan Taylor
(74) *Attorney, Agent, or Firm* — Leydig, Voit & Mayer, Ltd.

(57) ABSTRACT

A method to guide the placement of new small cell, wherein a small cell is a radio cell station with much smaller coverage area than a macro cell, having one or more existing wireless cells, one or more mobile devices of known location and application use and context, a processor and database system, a new small cell, a device for guiding the user in the placement of the new small cell, includes the steps: the location dependant measured network characteristics and location dependant contextual data needs of the mobile device are recorded and stored in the database system over time; and the contents of the database system are used to determine the likely future location specific network needs, such that this information together with the characteristics of the new small cell are used to determine the placement co-ordinates of the new small cell, and use the placement co-ordinates to guide a user in the placement of the new small cell, with the device for guiding the user.

15 Claims, 7 Drawing Sheets overview of method (Network analysis and placement determination)

(51) Int. Cl.
*H04W 16/20* (2009.01)
*H04W 84/04* (2009.01)

(58) Field of Classification Search
USPC .......................................................... 455/449
See application file for complete search history.

(56) References Cited

U.S. PATENT DOCUMENTS

| | | | | |
|---|---|---|---|---|
| 2007/0042799 A1* | 2/2007 | Jubin | .................... | H04W 52/04 455/522 |
| 2007/0097939 A1* | 5/2007 | Nylander | .......... | H04L 29/12066 370/338 |
| 2008/0069028 A1* | 3/2008 | Richardson | ........... | H04W 36/12 370/328 |
| 2008/0151777 A1 | 6/2008 | Allen et al. | | |
| 2008/0188265 A1* | 8/2008 | Carter | ................. | H04W 52/346 455/561 |
| 2008/0279552 A1 | 11/2008 | Ou et al. | | |
| 2009/0253421 A1* | 10/2009 | Camp, Jr. | .............. | H04W 24/02 455/418 |
| 2009/0296604 A1* | 12/2009 | Karaoguz | ............. | H04W 24/02 370/254 |
| 2010/0008323 A1* | 1/2010 | Deshpande | ........... | H04W 48/12 370/331 |
| 2010/0034495 A1* | 2/2010 | Horton | .................... | F16C 33/62 384/572 |
| 2010/0041364 A1* | 2/2010 | Lott | ...................... | G06Q 30/016 455/404.1 |
| 2010/0120394 A1* | 5/2010 | Mia | ...................... | H04W 64/003 455/404.2 |
| 2010/0255848 A1* | 10/2010 | Abraham | ............... | H04W 24/02 455/446 |
| 2010/0309790 A1* | 12/2010 | Polakos | ................... | H04L 41/12 370/241 |
| 2012/0252467 A1* | 10/2012 | Chen | ...................... | H04W 16/18 455/446 |
| 2013/0090790 A1 | 4/2013 | Yuen et al. | | |
| 2015/0312771 A1* | 10/2015 | Li | .......................... | H04W 24/02 455/446 |
| 2015/0327082 A1* | 11/2015 | Kadel | ................... | H04W 24/02 455/449 |

\* cited by examiner

Figure 1 – example mobile device architecture

Figure 2 – example network processor architecture

Figure 3 – overview of method (Network analysis and placement determination)

Figure 4 – overview of method (mobile device capture)

Figure 5 – illustration of concept (record)

Figure 6 – Illustration of concept (Placement)

METHOD TO GUIDE THE PLACEMENT OF NEW SMALL CELL

CROSS-REFERENCE TO RELATED APPLICATIONS

This application is a U.S. national phase application under 35 U.S.C. §371 of International Application No. PCT/EP2013/074355 filed on Nov. 21, 2013, and claims benefit to European Patent Application No. EP 12196130.4 filed on Dec. 7, 2012. The international application was published in English on Jun. 12, 2014 as WO 2014/086586 A1 under PCT Article 21(2)

FIELD OF THE INVENTION

The invention relates to the location of small cells for wireless communications within buildings or other restricted areas.

BACKGROUND OF INVENTION

As mobile networks rapidly evolve, it is widely forecast that there will be a profusion of connected devices and associated cells. In addition to conventional macro cells, many "small cells" will work at low energy levels and are designed to communicate with devices in the immediate local area. In this document small cell are defined as any radio cell with much smaller coverage area than conventional "macro" cells, including public "pico cells", residential femto cells, or Wifi access points.

A current example of a small cell is a femto-cell. A femto-cell is a portable, consumer deployed unit typically using licensed spectrum. Unlike the traditional base station, backhaul to the wireless communications network is via a consumer provided packet data (IP) connection, e.g. a DSL connection, rather than the dedicated or leased line switched circuit backhaul used in first and second generation cellular systems. Designed for indoor coverage, femto-cell radio power output nominally ranges from 0.5 to 1 Watt. Femto-cells are also known as "Home eNodeB's" in the Third Generation Partnership Program's (3GPP) Long Term Evolution (LTE) or Evolved UTRAN (eUTRAN) program Using small cells as a low cost approach to adding coverage and capacity to the wireless communications network raises some difficulties that embodiments of the present invention seek to address. The placement of small, inexpensive radio cells is not usually practicable by conventional cell location planning methods. Location of the small-cell is of the upmost importance however, since the small-cell location may be the only connection available to mobile users who have specific data needs (high bandwidth, low latency etc.) or who are located in buildings which create challenging reception conditions between the user and other network cells. Incorrect location can have a critical effect on the performance of the wider network (e.g. in terms of interference), and this is the key issue to be addressed for successful deployment.

Due to the number of cell types which are likely to be used in future mobile communication networks, which have different capacities, support different network topologies and have different bandwidth capabilities and the diversity of application needs, there is however an advantage to be gained in assisting the placement of small cells such that it optimally meets network needs, and also optimally meets user needs in the context of their location dependant usage of network resources.

More information can be found at "US2010120394 (A1)—Femto-Cell Location by Proxy Methods"

Current cell location planning methods are in general not suitable for the guided placement of small cells (whose placement may be undertaken by the network operator or the consumers), and other placement methods which have been discovered in the prior-art do not consider the contextual nature of a users mobile device use. Accordingly, at present there is no placement method or apparatus which allows the consumer placement of small cells in a way which takes into account the location specific needs of applications.

Specific restrictions include:

(i) The placement of the small cell should be consistent with the context in which users are utilising the network and the network resources available from other adjacent cells. For example, a user may need a very high bandwidth low latency connection in a specific location. A high bandwidth low latency connection may only be available in one part of the building (which has good coverage from a new macro cell) but the other part of the building (which only has coverage from previous generation cells) may coincide with the users normal location—which results in a limitation on the efficiency of associated applications. Clearly in this instance the small cell should be placed so as to meet the contextual location specific needs of the user, which is the subject of this invention. In other words, the position of the cell has to take into account both the existing coverage and the user's position-dependent requirements, which are independent of each other. Thus, depending on the user's needs, the small cell might coincide with the area of poor coverage, or it might coincide with the area of available good coverage (but for example low capacity of the macro cellular network), if this where it is required by the user(s).

(ii) While cell location planning or participatory sensing methods may identify areas of low or strong signal strength from surrounding cells, known approaches do not take into account how objects, such as stone walls, attenuate signals across a range of frequencies in the context of an applications needs. This is likely to become increasingly important for advanced mobile communication networks due to the deployment of communication links operating at different frequencies, ranging from GHz through THz, which may be omni- or unidirectional (if adaptive beamforming is used for example). If this is not considered in the placement of a small cell then suboptimal links may result as its placement will not adequately reflect the location and location specific signal attenuation of other cells in the area.

US2010120394 (A1)—Femto-Cell Location by Proxy Methods

Location of small, consumer deployed femto-cells cannot be determined by the usual site survey methods. Location of attached mobiles allows for a proxy location of the femto-cell that can then be used for wireless network planning including the provisioning of a calculated default emergency services location for the femto-cell.

The document discloses a method for use by a wireless location system (WLS) in locating a femto-cell device operating in a wireless communications system, comprising: discovering and initiating location of the femto-cell device; determining an identification of a mobile station (MS) being served by the femto-cell device;
determining the location of the MS; and
determining the location of the femto-cell device using the location of the MS.

Consequently a determination of the location of consumer deployed femto-cell using a proxy method based on the location of a Mobile Station is disclosed.

US2008151777 (A1)—System and Method for Core Network Topology Router Placement Planning Systems and methods for core network topology router placement planning are provided. The systems and methods may use existing network data to create a data set and use the data set to optimize a network for the placement of routers.

1. A method, comprising:

identifying a network topology;

calculating circuit locations from the network topology;

creating a dataset from the network topology and the circuit locations; and solving the dataset to determine at least one output indicative of a proposed placement of one or more routers in the network topology.

Summary: uses network topology to calculate placement location

US2008279552 (A1)—Methods of Placing Reconfigurable Optical Add/Drop Multiplexers (ROADMS) in a Network A distributed network including at least two Reconfigurable Optical Add/Drop Multiplexers (ROADMs) may be designed by a method including simulating routing of data traffic in a distributed network. The method may also include identifying a first location for placement of a first ROADM based at least partially on the simulated routing of the data traffic. The method may also include simulating rerouting of data traffic in the distributed network including the first ROADM at the first location. The method may further include identifying a second location for placement of a second ROADM based at least partially on the simulated rerouting of the data traffic.

The document discloses a method, comprising:

identifying a plurality of candidate locations based at least partially on an initial simulated routing of data traffic in a distributed network;

selecting at least one of the plurality of candidate locations for placement of a Reconfigurable Optical Add/Drop Multiplexer (ROADM) based at least partially on a cost; and simulating rerouting of data traffic in the distributed network including the at least one ROADM at the at least one selected candidate location.

The document uses simulations of routing data to assist in placement of multiplexers.

WO02071781 (A1)—Method of Cell Site Location in a Cellular Mobile Network

The location of a fixed transmit cell site in a cellular mobile telephone network is identified by a method including the steps of: deriving survey data measurements of the network by means of a mobile test telephone; grouping into individual subsets the survey data measurements derived on a drive route; identifying first site cluster data and second site cluster data for the transmit cell site location by means of multiple triangulation computations in which each individual point in respect of the geographical location data of the receiver of the test telephone is paired with each other individual point to provide in each case a pair of locations whose distance from the transmit cell site location is determined from the corresponding timing advance data; and determining which of the first site and second site cluster data has the greatest cluster density and determining centre of gravity of that site as identifying the location of the fixed transmit cell site. The survey data measurements comprise geographical location data of a receiver of the test telephone; timing advance data providing distance between the fixed transmit cell site and the receiver of the test telephone; and cell identity field data. Each subset of survey data measurements corresponds to measurements belonging to the same fixed transmit cell site.

The document discloses a method for identifying the location of a fixed transmit cell site in a cellular mobile telephone network, comprising the steps of: deriving survey data measurements of the network by means of a mobile test telephone, the survey data measurements comprising: geographical location data of a receiver of the test telephone; timing advance data providing distance between the fixed transmit cell site and the receiver of the test telephone; and cell identity field data; grouping into individual subsets the survey data measurements derived on a drive route, wherein each subset corresponds to measurements belonging to the same fixed transmit cell site; identifying first site cluster data and second site cluster data for the transmit cell site location by means of multiple triangulation computations in which each individual point in respect of the geographical location data of the receiver of the test telephone is paired with each other individual point to provide in each case a pair of locations whose distance from the transmit cell site location is determined from the corresponding timing advance data; and determining which of the first site and second site cluster data has the greatest cluster density and determining centre of gravity of that site as identifying the location of the fixed transmit cell site.

The document uses site survey data as part of a method to locate cells within a cellular network US2010309790 (A1)—Femto Base Stations and Methods Operating the Same Femto base stations and methods described herein suppress the need for an external GPS antenna and cable, while still providing a network service provider with the ability to obtain the desired GPS location coordinates and the user with the flexibility of placing the femto cell at the location of their choice within a home regardless of GPS signal strength.

The US application comprise a method operating a femto base station in a wireless network, the method comprising:

deciding, at the femto base station, whether position information signals are available;

determining, at the femto base station, whether anchor position information stored in a memory at the femto base station is valid if the deciding step decides that position information signals are unavailable, the anchor position information being indicative of an anchor position of the femto base station; and identifying network configuration parameters for the femto base station if the determining step determines that the stored anchor position information is valid.

SUMMARY OF INVENTION

The invention is presented as a way of guiding the mobile network operator or a user in the placement of a small cell based on the likely coverage, context of use and the capacity and location of existing wireless network connections.

The invention comprises a method to guide the placement of new small cell, wherein a small cell is a radio cell station with much smaller coverage area than a macro cell, comprising one or more existing wireless cells, one or more mobile devices of known location and application use and context, a processor and database system, a new small cell, a device for guiding the user in the placement of the new small cell, comprising the steps:

The location dependant measured network characteristics, and location dependant contextual data needs of the mobile device, are recorded and stored in the database system over time;

the contents of the database system are used to determine the likely future location specific network needs, such that this information together with the characteristics of the new small cell are used to determine the placement co-ordinates of the new small cell, and use the placement co-ordinates to guide a user in the placement of the new small cell, with the device for guiding the user.

In this context any radio cell or access point with a smaller coverage area than a macro cell defines a small cell. Thus a small cell could be a public "pico cell", residential femto cell, Wifi access point or any other arrangement where a transceiver which is of lower output power than a macro cell is deployed as part of a communications network.

In a preferred embodiment the database system is a server located in the internet or the local network of the user and receives information from the cells, the mobile device and other network components in the network which should be optimized. For example on a smart phone an application can run, which transmits its location, orientation, the running applications and the bandwith or response time needs. Furthermore the existing cells can also transmit the quality of connection the bandwith the number of lost packages, the kind of protocols etc. Other devices scanning the network can also be used to collect data which is imported into the database system. This information is then stored in the database system as a series of fields and records which comprise the database file for collecting this information.

In an preferred embodiment the placement location is determined a) by determining the location specific needs of the mobile device which are used across an area in the context of applications which are executed by a user on the mobile device, b) by measuring the network characteristics across this area wherein information a) and b) are used to establish a mapping showing how well location specific contextual application needs are met by existing network resources, and therefore where a new cell with defined characteristics can be best placed.

The location determination can also be used in connection with the transmittal of the connection status to cells of the mobile device. The device can inform the database server of its location and the detected base stations.

In a preferred embodiment the method (a) determines and characterizes the location dependent data needs of a mobile device, reflecting application usage and application needs of the mobile device. This can comprise of, for example, response time, data transfer bandwidth, lost packets, latency of packets etc.

(b) determines the availability of existing network resources at a specific location, or across an area, especially the area of potential influence of the new cell. This is done by analysing the database of the database system or by collecting information of the mobile device, which provides the connection status to the cells, or by manual input.

(c) characterizing the new cell in terms of at least its capacity, bandwidth, power and latency. In this instance, it is assumed that the characterization will be for a preexisting cell. Other embodiments may however characterize the new cell which is required to determine the specific cell type which should be acquired.

(d) comparing (a) and (b) to determine the location dependent contextual needs for the network. This is computed for the geo-coordinates representing a defined boundary area within which the new cell is to be placed in (within a building, office, hotel etc.). The geo-coordinates can be in either two or three dimensions if, for example, the building has multiple floors. In some embodiments it can be necessary that several cells are installed to conform with the needs of users, (e) comparing (c) and (d) and computing the result to determine the best location for the new cell in view of possible location sites. The best location for the new cell is computed by (i) retrieving the location dependent contextual needs for the network data from (d). This provides a map of the network connection needs (bandwidth, latency etc.) against specific location co-ordinates. (ii) the new cell characterized in (c) is simulated at multiple locations within the boundary area, and (d) an optimization algorithm is used to identify the X, Y (optionally Z) coordinates where the new cell should be placed to most optimally meet the network needs.

Alternatively, if the new small cell is a cell (as opposed to a wireless access point) the computation may be done in a way whereby the wireless cells or wireless access points overlap optimally. The optimal location can be calculated by simulation or by other optimization procedures.

(f) to guide the operator or the user in the placement of the new small cell.

In a preferred embodiment the determining of the location specific needs of the mobile device which are used across an area is done iteratively, especially after placement of a new cell. By this approach the success and a possible relocation of the new cell can be performed.

In a preferred the location of the mobile device is determined by using data collected by the mobile device and/or network, to determine the users location, the mobile device collects measurements and passes them to the database system, and/or GPS (Global Position System) is used on the mobile device, and/or SiRFusion product range from CSR is used, to enable the location of the mobile device to be computed by fusing the output data together with a number of different geo-location technologies, including triangulation or GPS.

In a preferred embodiment the application, and associated data needs are stored in the database system, comprising one or more of the following fields: name of applications, protocol type, Bandwith, IP-Packets lost, latency of transmission, QoS (Quality of Service), QoE (Quality of Experience), received signal strength and direction, connected cell and contextual usage information.

The information are collect by an application running on the mobile device and are transferred automatically in the background to the database system over the network. This application is in a preferred embodiment an app which is installed on a smart phone. Also the network stations can provide the information. The information is preferably only collected if the mobile device is in an area where a new small cell should be installed.

In a preferred embodiment it is determined if the current location is deemed to be an Area of Potential Influence of the planned placement of a new small cell, if the users current location is within the Area of Potential Influence, then the method proceeds to determine the location of a small cell. Which means that only in case of a relevant area the method is performed The Area of Potential Influence of the planned placement of the new small cell is be determined according to one or more of the following steps:

Network operators or user flags to the database system that they wish to install a small cell at a location where the small cell is to be placed;

Based on the collected data over a time the database system proposes a location where the small cell is to be placed.

In case no or little network connection is given the location dependant measured network characteristics, and location dependant contextual data needs of the mobile device, are recorded and stored offline, and are uploaded to the database system when a better connection is available.

In a preferred embodiment the device for guiding includes an orientation sensor, which may assist with the collection and/or position of small cell information. In a preferred embodiment an application running on a mobile device or a smart phone can implement the device for guiding. Especially smart phones include location sensors which can be used to guide a user to an optimal location for the new small cell.

The device for guiding the user guides the user to the location using visual, audible or other means.

This Guidance of user can be achieved using one or more of the following approaches including
(i) use building mapping data if available and plot desired location on map and direct user,
(ii) use wireless fingerprint information to guide user using text/audio based commands,
(iii) detect presence of other connected devices near the desired location and form an association with them which.

After location of the new small cell accurate placement is supervised, by using triangulation or other location estimation techniques and testing and calibrating the cell, and preferably providing a status update to the user.

Another part of the invention is a system comprising a database system characterized to implement the method according to one of the claims 1 to 14.

The advantages of the invention which relate to each of the Distinguishing Technical Features are as follows:
(a) The invention can determine and characterizing the location dependent data needs of a mobile device, reflecting application usage. This approach allows to characterize the properties required of communication links to a specific location
(b) The invention can determine the availability of existing network resources at a specific location, or across an area ("the area of potential influence of the new cell"). This approach allows to find out the properties of links which already can connect to a location
(c) The invention can characterise the new cell in terms of at least its capacity, bandwidth, power and latency This approach allows to determine the properties of the new cell which is to be placed.
(d) The invention can compare (a) and (b) to determine the location depended contextual needs. This approach allows computing the required resources
(e) The invention can compare (c) and (d) and computing the result to determine the best location for the new cell in view of possible location sites. This approach allows determines the location required for placement.
(f) The invention can guide the operator or the user in the placement of the cell. This approach allows an optimal positioning of the new cell.

DETAILED DESCRIPTION OF PREFERRED EMBODIMENTS

Figure 1:
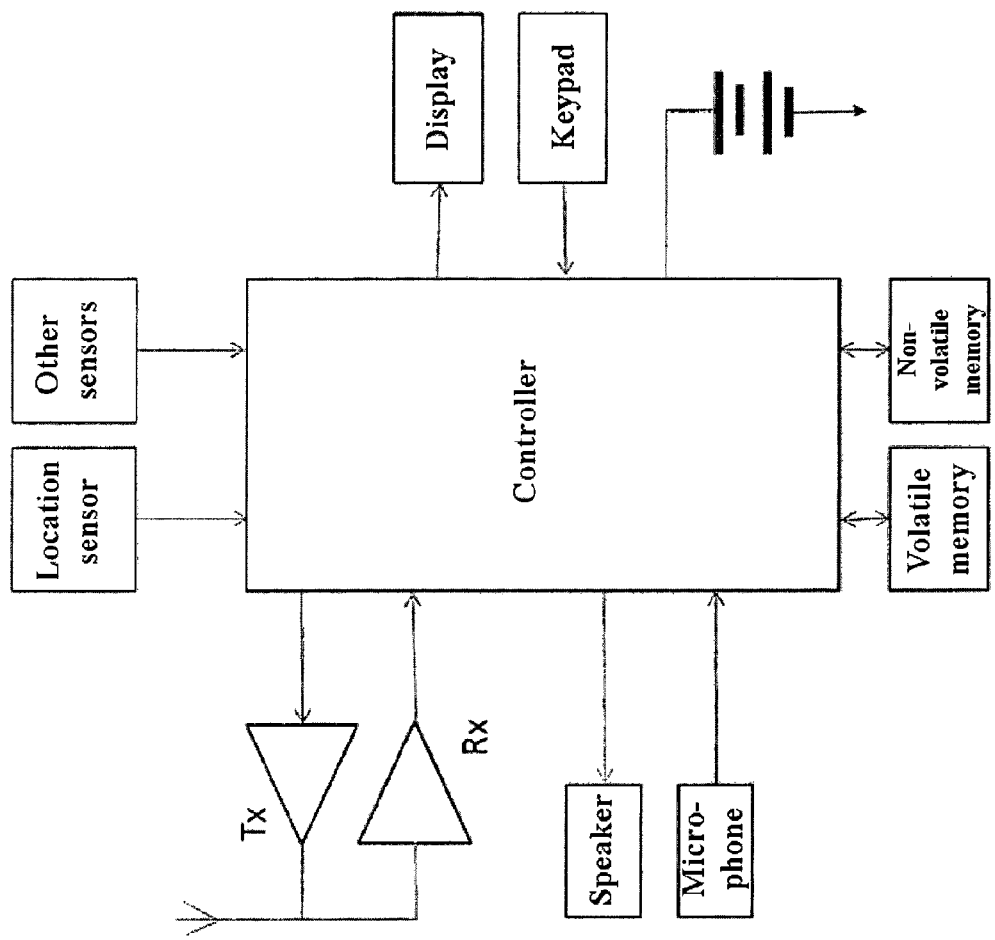
FIG. 1 shows a mobile device architecture

The a good placement location can be determined by
(i) determining the location specific needs of mobile device(s) which are used across an area in the context of applications which are executed by a user (for example, real time streaming video has very different needs to a file download),
(ii) by measuring the network characteristics across this area.

This information (i and ii) allows a mapping to be established showing how well location specific contextual application needs are met by existing network resources, and therefore where a new cell (with defined characteristics) can be best placed.

Existing cell location planning approaches, which are typically based on prediction and/or sensing signal strength, the use of network mapping and characterisation data, and capacity planning tools, do not take account of the location specific usage context of users. As users data and application use evolves, this will become increasingly important. For example, the data needs of a streamed YouTube UHD video are very different to those of a Skype real-time video link in terms of latency and bandwidth. Due in part to the profusion of cells and possible links under advanced communication networks (which will incorporate legacy network resources), it is envisaged that whilst the data needs of some applications may be met by existing network resources, such as macro cells, the data needs of other (due to bandwidth or latency needs) may not be, particularly when capacity constraints are also considered.

Therefore, key elements of the invention responsible for the advantages are the iterative discovery of applications which are executed by users in different locations and their respective data needs, and considering these with respect to existing network resources which may already be available at the users location. This is one example of the usage context, but clearly there may be others.
(i) Determining location specific application needs. Assuming the mobile device is in range of a cell, this can be solved either using data collected by the mobile device and/or network, To determine the users location, the mobile device collects measurements (e.g. of the relative timings of signals received from nearby base stations) and passes them to the network, which then calculates the mobile's position and passes it to an external application server. Alternatively devices, such as SiRFusion product range from CSR, allow the location of the mobile device to be computed by fusing the output data together of a number of different geo-location technologies, including triangulation or GPS. Having determined the location of the mobile device, this can be correlated with the time variant application use. Once the location and application, and associated data needs, are characterized, the resulting data may be communicated to a server where it is stored for future use. As these steps are associated with the placement of a new cell, it may be the case that in the area of its potential location there is little or no coverage by existing cell's, meaning that the desired applications cannot be executed. As a result they will not be recorded by the above steps. In this instance the following approach may be adopted (i) understand which users enter the area of potential influence of the new cell by tracking the users mobile device location (if necessary, this can be achieved "offline" by storing historical locations and uploading these when a connection becomes available.) (ii) profile one or more of the users who are in the area of potential influence of the new cell to determine their historical application use in other areas which may reasonable be expected to be carried over to the area of potential influence of the new cell. (this may be achieved, for example, by cross-referencing the geo-location of the property to determine its type (home, office, station etc), and then using this to characterize the users likely use of this location compared to other locations of the same type which they have visited.

(ii) Determining network resources which may already be available. Similarly to (i) this may be determined either through the use of a participatory sensing approach using mobile devices or (ii) through existing network models which may have been developed using site surveys or other existing methods.

Thus some distinguishing technical features of the invention are (a) determining and characterizing the location dependent data needs of a mobile device, reflecting application usage, and iterate as needed (b) determining the availability of existing network resources at a specific location, or across an area ("the area of potential influence of the new cell"), (c) characterising the new cell in terms of at least its capacity, bandwidth, power and latency, (d) comparing (a) and (b) to determine the location dependent contextual needs (e) comparing (c) and (d) and computing the result to determine the best location for the new cell in view of possible location sites and finally (f) to guide the operator or the user in the placement of the new small cell.

It should be noted that the invention has a large number of possible embodiments the description does not intend to limit this scope. The text represents one possible embodiment, and uses a mobile device based implementation. Other possible embodiments, for example using network based implementations (some of which have been referred to above), are not illustrated.

The system described may be divided between functions which are implemented on a mobile device, with their results communicated to a network based processing system/database system, and functions which themselves are implemented on the network based processing system which may, for example, form part of the network infrastructure. An overview of an example mobile device architecture is shown in FIG. 1, and an example network architecture (related to the functions relevant for the invention) in FIG. 2.

FIG. 1 represents a mobile device which includes means of determining its location, both inside and outside a building. Other sensors may also be included, for example to determine its orientation, which may assist with the collection of cell placement information. Display means are also incorporated, and in addition other output devices may also be included to help direct the user to the cell placement site. These may include haptic devices, or audible instructions, for example.

Figure 2:
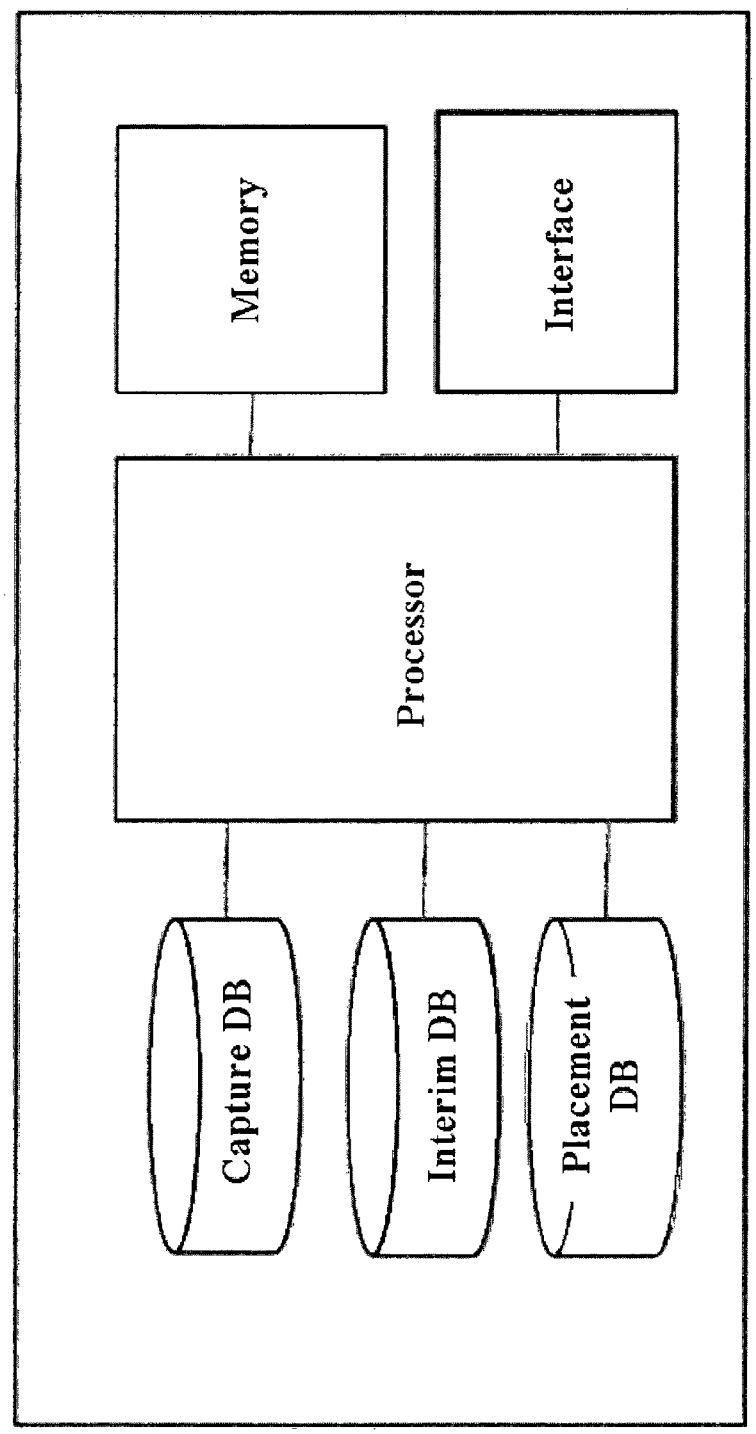
FIG. 2 shows an example network processor architecture

FIG. 2 represents an example network processor architecture/database system. Data which is collected by the mobile device is written into one of three databases which are controlled by a Processor, which has access to local memory and also an interface which allows its communication to the mobile device.

Figure 4:
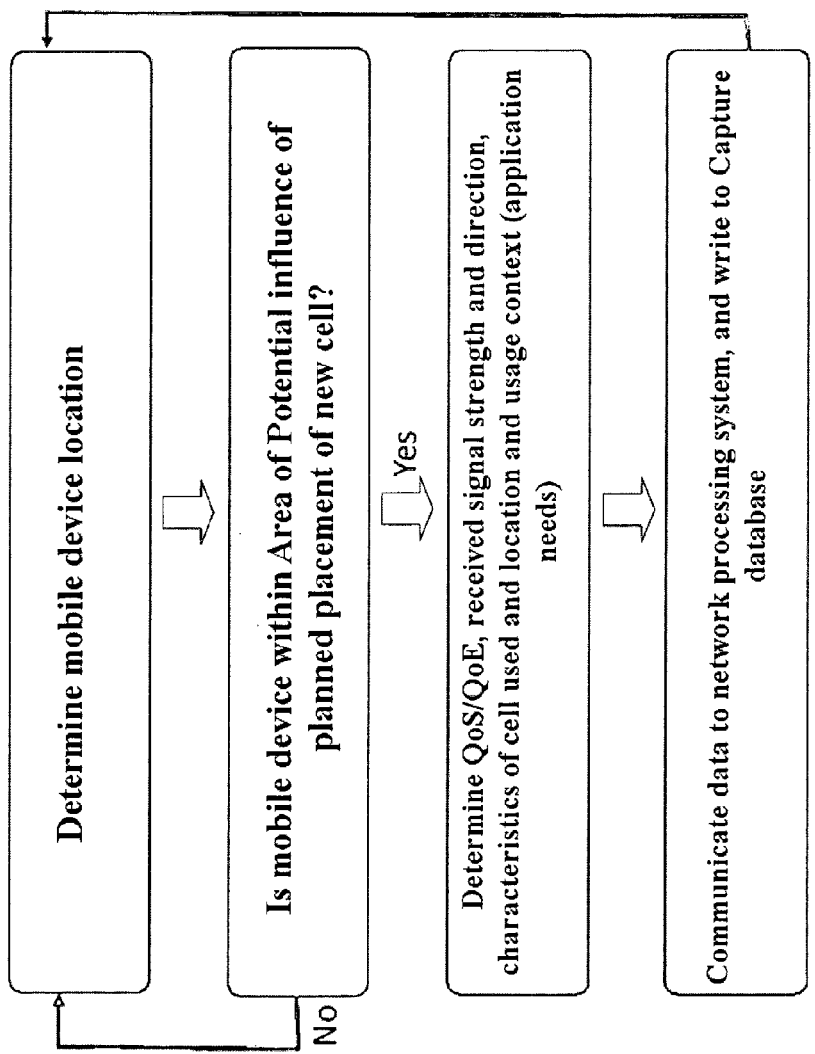
FIG. 4 shows a flow chart of the method on the mobile device

A method is implemented on each of the network processor and mobile device architectures. The method for the mobile device architecture, which is represented by FIG. 4, is presented below:

The first step determines the location of the mobile device, using one of a range of known geo-location technologies such as GPS if the mobile device is outside of a building, or a combination of triangulation and other techniques such as inertial estimation (as implemented on the SiR-Fusion device from CSR, for example) if the mobile device is within a building.

Consequently the input is the physical location of user, and the Output is the numeric representation of user co-ordinates.

The second step compares the users current location to that which is deemed to be an "Area of Potential Influence" of the planned placement of a new small cell. If the users current location is within the Area of Potential Influence, then the method proceeds, otherwise it loops back to the start.

An Area of Potential Influence of the planned placement of the new small cell may be determined as follows:

Network operators or user flags to system that they wish to install a small cell Network operator or user indicates when they are at a location (e.g. in the building) where the cell is to be placed The area is then defined as the Area of Potential Influence.

Alternatively, the mobile device method can be executed on all defined mobile devices allowing data to be collected for all locations over a period of time for the best results, or an equivalent approach yielding similar results can be executed on network resources (however it should be noted that this may have associated user privacy problems). If this approach is taken the 2nd step can be deleted.

Consequently the input is the user location and Area of Potential Influence definition, and the output is continue to return to start loop.

The third step determines the properties of the connection at the users location and can include parameters such as QoS (Quality of Service), QoE (Quality of Experience), received signal strength and direction, connected cell and contextual usage information.

Special Note: As this step is associated with the placement of a new small cell, it may be the case that in the area of its potential location there is no or little coverage by existing cell's, meaning that the desired applications cannot be executed. As a result they will not be recorded. In this instance the following approach may be adopted (i) understand which users enter the area of potential influence of the new cell by tracking the users mobile device location (if necessary, this can be achieved "offline" by storing historical locations and uploading these when a connection becomes available.)

(ii) profile one or more of the users who are in the area of potential influence of the new cell to determine their application use in other areas which may reasonable be expected to be carried over to the area of potential influence of the new cell. (this may be achieved, for example, by cross-referencing the geo-location of the property to determine its type (home, office, station etc), and then using this to characterize the users likely use of this location compared to other locations of the same type which they have visited Consequently the input is the user location, and the output is the user location tagged with contextual connection properties The fourth step communicates the user location tagged with contextual connection properties to the network processing system, and records this as a record in the Capture database.

Consequently the Input is the user location tagged with contextual connection properties, and the Output is the record stored in capture database.

Figure 3:
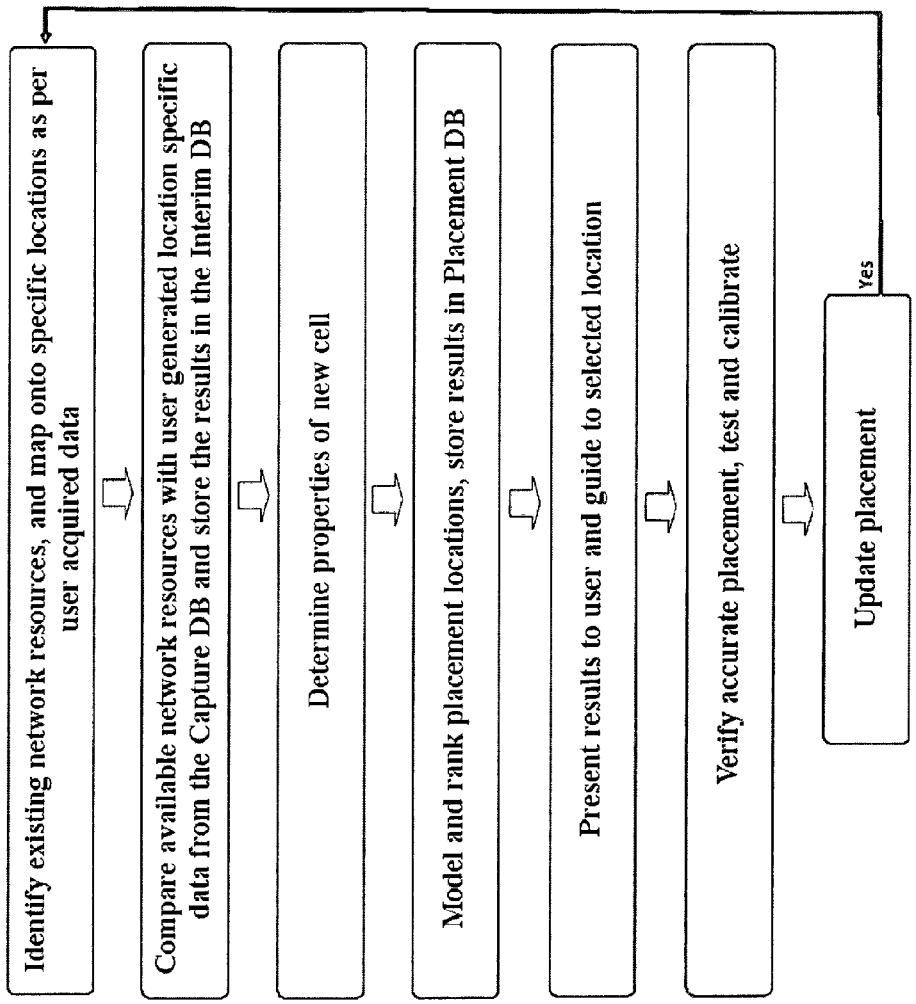
FIG. 3 shows a flow chart of the method

Following the method for the mobile device architecture, the method for the network architecture which is represented by FIG. 3, is presented below:

The first step identifies existing network resources for the Area of Potential Influence by utilising the knowledge of the macro network (location of sites, available technologies, technical parameters . . . ) which are available from the mobile network operator, and loads this data into local memory.

Consequently the input is the Area of Potential Influence of the new cell placement, and the output are the properties of existing network resources across Area of Potential Influence.

The second step compares the output from step 1 with the contents of the Capture database. In effect this compares the available network resources with the resources which are required. The difference is computed and stored as a representation in the Interim database.

Consequently the Input is the Capture database, properties of existing network, and the Output is the Difference between existing network resources and those resources optimally needed given the location specific contextual usage of mobile devices.

The third step determines the properties of the new small cell either directly or indirectly, and stores these in local memory.

Consequently the Input is the Product reference code (for example), and the Output is the cell/access point properties.

The fourth step models the impact of the new cell using information from the Interim database, and calculates the placement location of the cell which will achieve the desired placement characteristics (for the user, network operator etc.). Desirably, mapping data reflecting the building structure should also be considered at this point so as to ensure that placement locations are accessible with power availability etc. Possible placement locations are ranked, and stored in the placement database.

Consequently the Input is the New cell information, locations and contextual specific network needs (Interim database), and the Output is the Ranked placement locations.

The fifth step presents the results to the user, and guides the user to the location using visual, audible or other means. Guidance of user can be achieved using a number of approaches including (i) use building mapping data if available and plot desired location on map and direct user, (ii) use wireless fingerprint information (from wifi etc.) to guide user using text/audio based commands, (iii) detect presence of other connected devices near the desired location and form an association with them which can result in the user being advised to place the consumer cell "next to the HP8500 printer", for example.

Consequently the input is the Ranked placement results, and the Output is user instructions to locate placement location.

The sixth step verifies accurate place by using triangulation or other location estimation techniques and tests and calibrates the cell, and provides a status update to the user.

Consequently the Input is the Cell placement location, and the Output is the status update.

The final step makes provision to the location to be updated, either as network or user requirements have changed, or if the physical location of the cell is arbitrarily changed by the user.

Consequently the Input are possible changes and the Output is the iteration of the process.

In the following a use case will be described.

Figure 5:
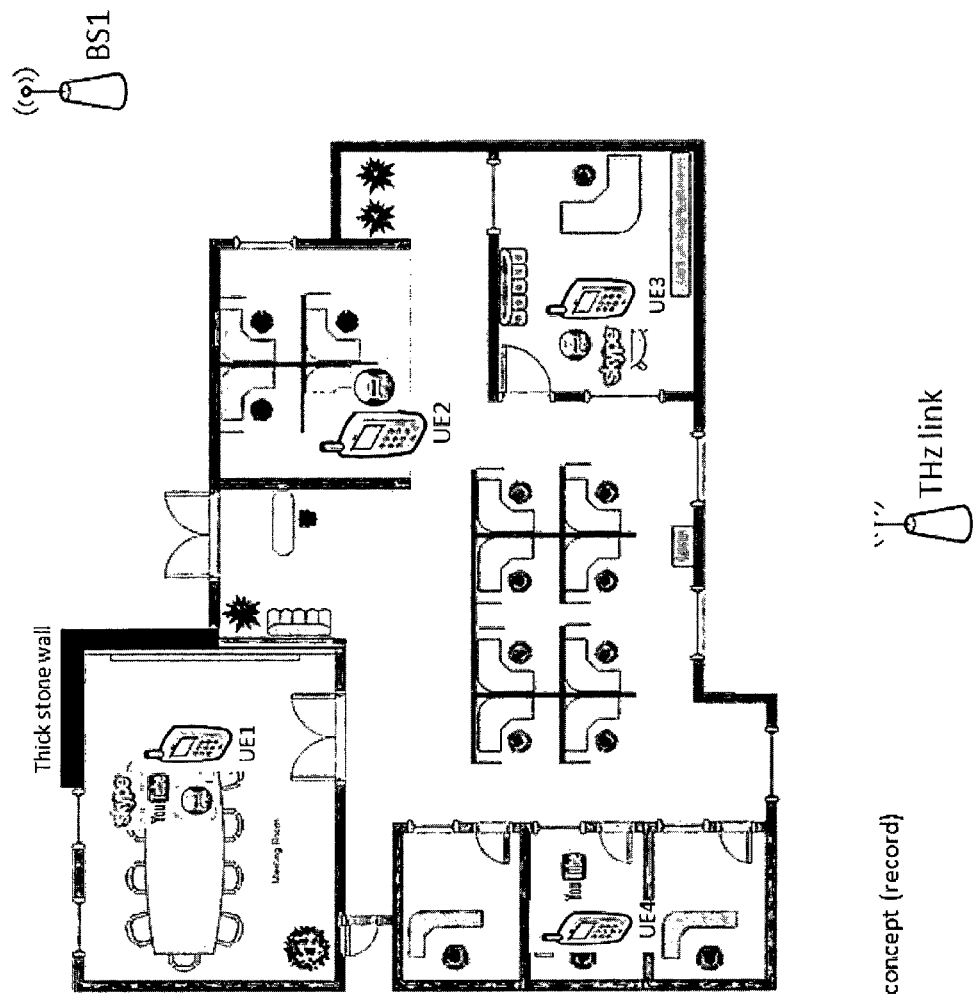
FIGS. 5 and 6 show the location of small cells within an apparment before and after the method

In a first step information are Captured. As can be seen in FIG. 5, a building is covered by a macro-cellular basestation BS1. Most users experience good coverage, however the meeting room—which is partly blocked by a thick wall—suffers high levels of signal attenuation. Therefore, users (e.g. UE1) who wish to run demanding applications (as opposed to less demanding voice calls) suffer a very poor QoE. This is captured, and stored in the Capture database and is also reflected in the Interim database.

Figure 6:
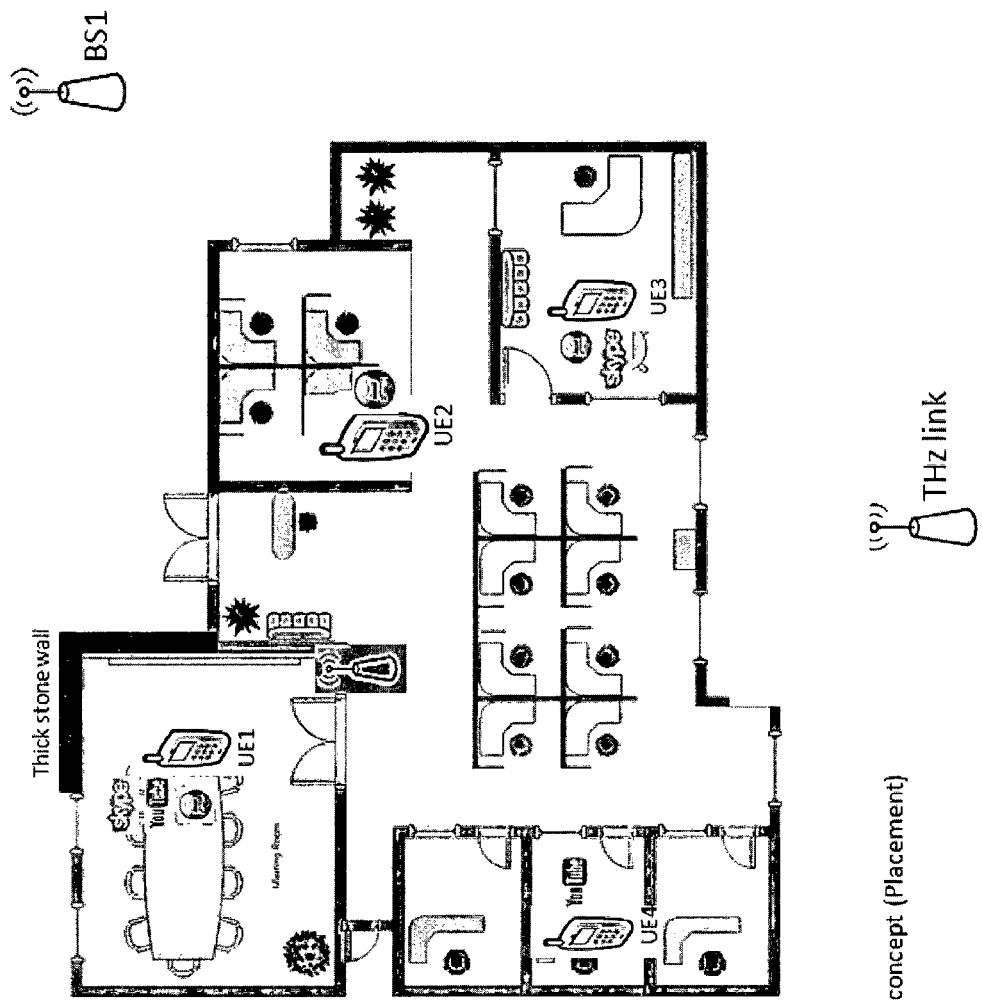

In a second step a Placement of the new cell is determined. As can be seen in FIG. 6, a new small cell BS2 is placed in a position where UE1, who is located in the meeting room, suffers little signal attenuation. It is placed in this location as a result of the computation which has been carried out, with the ranked results being stored in the Placement database. As a result of the optimal placement of the new cell, which is positioned making use of contextual application information, a higher level of QoE for UE1 can be achieved as well as other network advantages.

Additional details are provided below:

| Live incoming data | | | |
| --- | --- | --- | --- |
| Geo-location (device) | Possible Services at loactions | Used service | Radio Planning information (e.g. avg. SNR) |
| Pos 1 (UE1) | HTTP, Video calls, Video | HTTP, Video calls, Video | 1 dB |
| Pos 2 (UE2) | HTTP, Video calls, Video | HTTP, Video calls, Video | 10 dB |
| Pos 3 (UE3) | HTTP, Video calls, Video | HTTP | 11 dB |
| pcs 4 (UE4) | HTTP, Video calls, Video | HTTP | 7 dB |

| Database/statistics/history | | | |
| --- | --- | --- | --- |
| Geo-location | Successfully used services | Unsuccessfully used services | Radio Planning Info (e.g. avg. SINR) |
| Pos 1 (UE1) | 3 x HTTP, 4 x video | 4 x video call | 1 dB |
| Pos 2 (UE2) | 2 x video call, 2 x video | None | 10 dB |
| Pos 3 (UE3) | 3 x HTTP | None | 11 dB |
| Pos 4 (UE4) | 3 x HTTP | None | 7 dB |

Derivation of new site
High probability of occurance of unsuccessful services at Pos 1 which are required by users (UE1) at Pos 1
Bad SINR (1 out of 4 cases)
A new site is derived based on the needs identified at Pos 1, and site information including power access, fixed line availability, avg position and building plans.

Figure 7:
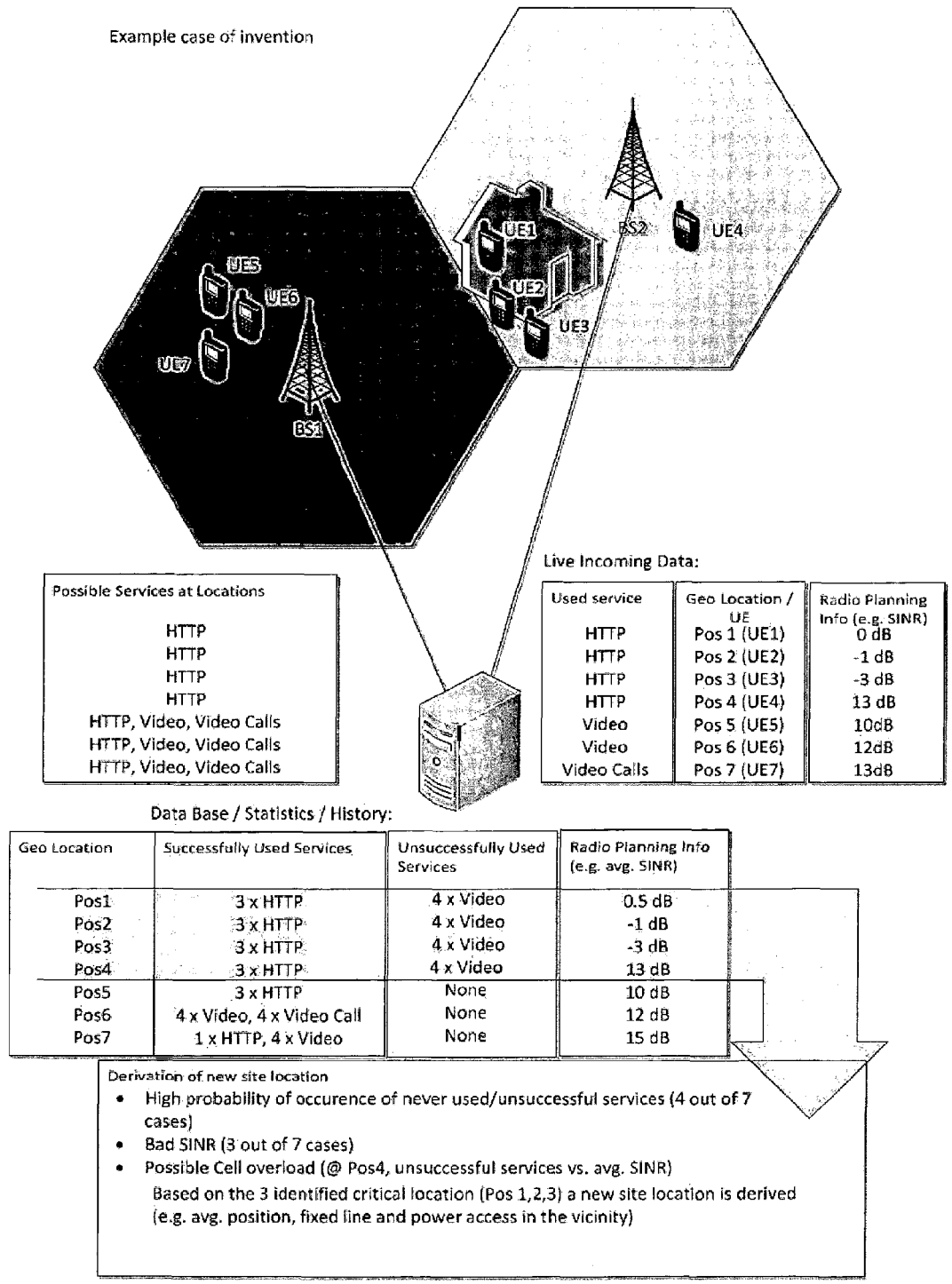
FIG. 7 shows a scenario of a mobile network with an exemplary derivation of a new site location

A further use case is described in FIG. 7.

Two base stations are illustrated with ideal coverage areas typically represented by hexagons. BS1 serves 3 terminals (UE5, UE6, UE7) and BS2 serves 4 terminals (UE1, UE2, UE3, UE4). While the assigned terminals in BS1 are experiencing a good link quality (e.g. UE5 with 10 dB SINR), 3 out of 4 terminals at BS2, have a bad link quality (e.g. UE1 with 0 dB SINR) due to their appearance in the network at the cell edge or indoor at the cell edge.

Each terminal is using a service and requires an amount of radio resources to get a satisfying quality of experience. If the user, who lives for example in the depicted house, is always experiencing a bad quality while trying to do a video call, he will probably not try it again after a while. In the example, the terminals, which occur at the cell edge or indoor, use an http service. Additionally UE4, which has a good radio link, is only able to use a satisfying http service, due to problem that the cell might be overloaded. This might come from the problem, that the other served terminals need a higher amount of resources, due to the bad radio link, to fulfill the requirements of the used services. The information of each single user is stored in a central data base, which collects statistics of each occurred location. This will result in a huge amount of data, on which the location for a needed new site location can be derived. In the example it is shown, that in 4 out of 7 locations, http services were successfully used. In 3 out of those 7 locations a bad SINR has occurred. Thus, any service with higher quality requirements has never been used with a good experience at the positions 1, 2 and 3. In addition, at these positions the radio link conditions are bad. Based on the combined information of the positions, a new site location can be derived (e.g. the average position of those 3 or a position in the vicinity which fulfills additional requirements, such as fixed line and power access).

I While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

STATE OF ART

[1] US2010012294 (A1)—Femto-Cell Location by Proxy Methods

[2] *Background text based on extract from "US2010120394 (A1) Femto-Cell Location by Proxy Methods"

[3] US2010120394 (A1)—Femto-Cell Location by Proxy Methods

[4] US2008151777 (A1)—SYSTEM AND METHOD FOR CORE NETWORK TOPOLOGY ROUTER PLACEMENT PLANNING

[5] US2008279552 (A1)—Methods of placing reconfigurable optical add/drop multiplexers (ROADMS) in a network

[6] WO02071781 (A1)—METHOD OF CELL SITE LOCATION IN A CELLULAR MOBILE NETWORK

[7] US2010309790 (A1)—Femto base stations and methods nor operating the same.

The invention claimed is:

1. A method to guide a placement of a new small cell, comprising:
   recording and storing, in a database system over time, location-dependent measured network characteristics and location-dependent contextual data needs of the mobile device;
   determining, by a processor, likely future location-specific network needs based on the recorded and stored location-dependent measured network characteristics and location-dependent contextual data needs of the mobile device;
   using, by the processor, the determined likely future location-specific network needs and characteristics of the new small cell in:
   a) determining and characterizing of location-dependent data needs of a mobile device, reflecting application usage,
   (b) determining availability of existing network resources at a specific location or across an area of potential influence of the new small cell,
   (c) characterizing the new small cell with respect to capacity, bandwidth, power and latency,
   (d) comparing the location-dependent data needs of the mobile device with the availability of existing network resources to determine location-dependent contextual needs, and
   (e) comparing the characteristics of the new small cell with the location-dependent contextual needs, and determining placement coordinates of the new small cell based on possible location sites; and
   using, by a device for guiding the user in the placement of the new small cell, the placement coordinates to guide a user in the placement of the new small cell;
   wherein the new small cell is a radio cell station with smaller coverage area than a macro cell;
   wherein accurate placement of the new small cell is facilitated by using location estimation techniques, and testing and calibrating the new small cell.

2. The method according to claim 1, wherein determining and characterizing of location-dependent data needs of a mobile device further comprises determining location-specific network needs of the mobile device across a usage area in the context of applications executed on the mobile device;
   wherein determining availability of existing network resources at a specific location or across an area of potential influence of the new small cell further comprises measuring network characteristics across the usage area; and
   wherein the method further comprises:
   establishing, based on the location-specific network needs of the mobile device across a usage area and the measured network characteristics across the usage area, a mapping showing how well location-specific contextual application needs are met by existing network resources.

3. The method according to claim 2, wherein the determining of the location-specific network needs of the mobile device across the usage area is performed iteratively.

4. The method according to claim 1, wherein a location of the mobile device is determined by using data collected by the mobile device or network.

5. The method according to claim 1, wherein the stored location-dependent contextual data needs of the mobile device include one or more of the following fields: name of applications, protocol type, bandwidth, packets lost, latency of transmission, Quality of Service (QoS), Quality of Experience (QoE), received signal strength and direction, connected cell, and contextual usage information.

6. The method according to claim 1, wherein location-dependent measured network characteristics and location-dependent contextual data needs of the mobile device are first recorded and stored offline and later uploaded to the database system.

7. The method according to claim 1, wherein the device includes an orientation sensor.

8. The method according to claim 7, wherein the Area of Potential Influence of the planned placement of the new small cell is determined according to one or more of the following:
   a network operator or used flagging to the database system that the new small cell is to be installed at a location; and
   based on collected data over time, the data base system proposing a location where the new small cell is to be placed.

9. The method according to claim 8, wherein the device visually or audibly guiding the user includes one or more of the following:
   using building mapping data and plotting a desired location on a map;
   using wireless fingerprint information to guide the user using text or audio commands;
   detecting other connected devices near the desired location and form an association with the other connected devices.

10. The method according to claim 1, wherein the method further comprises, after determining a current location of the mobile device, determining whether the current location of the mobile device is in an Area of Potential Influence of a planned placement of the new small cell.

11. The method according to claim 1, wherein the device visually or audibly guides the user in the placement of the new small cell.

12. The method according to claim 1, wherein the new small cell is a pico cell, a residential femto cell, or a WiFi access point.

13. A non-transitory computer-readable medium having processor-executable instructions stored thereon for determining placement of a new small cell, the processor-executable instructions, when executed, facilitating performance of the following:
   determining likely future location-specific network needs based on stored location-dependent measured network characteristics and location-dependent contextual data needs of the mobile device;
   using the determined likely future location-specific network needs and characteristics of the new small cell in:
   a) determining and characterizing of location-dependent data needs of a mobile device, reflecting application usage,
   b) determining availability of existing network resources at a specific location or across an area of potential influence of the new small cell,
   c) characterizing the new small cell with respect to capacity, bandwidth, power and latency,
   d) comparing the location-dependent data needs of the mobile device with the availability of existing network resources to determine location-dependent contextual needs, and
   e) comparing the characteristics of the new small cell with the location-dependent contextual needs, and determining placement coordinates of the new small cell based on possible location sites
   wherein the new small cell is a radio cell station with smaller coverage area than a macro cell;
   wherein accurate placement of the new small cell is facilitated by using location estimation techniques, and testing and calibrating the new small cell.

14. A method to guide a placement of a new small cell, comprising:
   recording and storing, in a database system over time, location-dependent measured network characteristics and location-dependent contextual data needs of the mobile device;
   determining, by a processor, likely future location-specific network needs based on the recorded and stored location-dependent measured network characteristics and location-dependent contextual data needs of the mobile device;
   using, by the processor, the determined likely future location-specific network needs and characteristics of the new small cell in:
   a) determining and characterizing of location-dependent data needs of a mobile device, reflecting application usage,
   b) determining availability of existing network resources at a specific location or across an area of potential influence of the new small cell,
   c) characterizing the new small cell with respect to capacity, bandwidth, power and latency,
   d) comparing the location-dependent data needs of the mobile device with the availability of existing network resources to determine location-dependent contextual needs, and
   e) comparing the characteristics of the new small cell with the location-dependent contextual needs, and determining placement coordinates of the new small cell based on possible location sites; and
   using, by a device for guiding the user in the placement of the new small cell, the placement coordinates to guide a user in the placement of the new small cell;
   wherein the new small cell is a radio cell station with smaller coverage area than a macro cell;
   wherein determining and characterizing of location-dependent data needs of a mobile device further comprises determining location-specific network needs of the mobile device across a usage area in the context of applications executed on the mobile device;
   wherein determining availability of existing network resources at a specific location or across an area of potential influence of the new small cell further comprises measuring network characteristics across the usage area; and
   wherein the method further comprises:

establishing, based on the location-specific network needs of the mobile device across a usage area and the measured network characteristics across the usage area, a mapping showing how well location-specific contextual application needs are met by existing network resources.

15. A non-transitory computer-readable medium having processor-executable instructions stored thereon for determining placement of a new small cell, the processor-executable instructions, when executed, facilitating performance of the following:

determining likely future location-specific network needs based on stored location-dependent measured network characteristics and location-dependent contextual data needs of the mobile device;

using the determined likely future location-specific network needs and characteristics of the new small cell in:
- a) determining and characterizing of location-dependent data needs of a mobile device, reflecting application usage,
- (b) determining availability of existing network resources at a specific location or across an area of potential influence of the new small cell,
- (c) characterizing the new small cell with respect to capacity, bandwidth, power and latency,
- (d) comparing the location-dependent data needs of the mobile device with the availability of existing network resources to determine location-dependent contextual needs, and
- (e) comparing the characteristics of the new small cell with the location-dependent contextual needs, and determining placement coordinates of the new small cell based on possible location sites wherein the new small cell is a radio cell station with smaller coverage area than a macro cell;

wherein determining and characterizing of location-dependent data needs of a mobile device further comprises determining location-specific network needs of the mobile device across a usage area in the context of applications executed on the mobile device;

wherein determining availability of existing network resources at a specific location or across an area of potential influence of the new small cell further comprises measuring network characteristics across the usage area; and wherein the processor-executable instructions, when executed, further facilitate:

establishing, based on the location-specific network needs of the mobile device across a usage area and the measured network characteristics across the usage area, a mapping showing how well location-specific contextual application needs are met by existing network resources.

* * * * *